United States Patent
Josyula et al.

(10) Patent No.: US 11,812,762 B2
(45) Date of Patent: *Nov. 14, 2023

(54) METHODS FOR REDUCED REFINING DURING COCOA LIQUOR PROCESSING

(71) Applicant: MARS, INCORPORATED, McLean, VA (US)

(72) Inventors: Aditya Josyula, Elizabethtown, PA (US); Dale Slesser, Elizabethtown, PA (US); John Kaiser, Elizabethtown, PA (US); Rogaite Shafi, Elizabethtown, PA (US); Matthew Kelley, Elizabethtown, PA (US); Jose Gonzalez, Elizabethtown, PA (US)

(73) Assignee: Mars, Incorporated, McLean, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/572,967

(22) Filed: Jan. 11, 2022

(65) Prior Publication Data

US 2022/0174975 A1 Jun. 9, 2022

Related U.S. Application Data

(63) Continuation of application No. 16/472,715, filed as application No. PCT/US2017/068641 on Dec. 28, 2017, now Pat. No. 11,219,226.

(60) Provisional application No. 62/440,184, filed on Dec. 29, 2016, provisional application No. 62/440,182, filed on Dec. 29, 2016.

(51) Int. Cl.
*A23G 1/00* (2006.01)
*A23G 1/46* (2006.01)

(52) U.S. Cl.
CPC ........... *A23G 1/0006* (2013.01); *A23G 1/002* (2013.01); *A23G 1/0033* (2013.01); *A23G 1/0036* (2013.01); *A23G 1/46* (2013.01); *A23V 2002/00* (2013.01)

(58) Field of Classification Search
CPC ........ A23G 1/0006; A23G 1/002; A23G 1/33; A23G 1/36; A23G 1/42; A23V 2002/00
See application file for complete search history.

(56) References Cited

U.S. PATENT DOCUMENTS

| | | | |
|---|---|---|---|
| 2,336,346 | A | 12/1943 | Carver |
| 3,423,031 | A | 1/1969 | Merges et al. |
| 4,620,477 | A | 11/1986 | Ripani et al. |
| 4,758,444 | A | 7/1988 | Terauchi |
| 6,296,891 | B1 | 10/2001 | Zumbe et al. |
| 8,906,442 | B2 | 12/2014 | Buri et al. |

(Continued)

FOREIGN PATENT DOCUMENTS

| | | |
|---|---|---|
| EP | 0118901 A2 | 9/1984 |
| EP | 3114939 A1 | 1/2017 |

(Continued)

*Primary Examiner* — Anthony J Weier (57) ABSTRACT

Methods and systems for providing processed cocoa nibs are provided. The methods involve coarse grinding cocoa nibs to form a slurry and subjecting less than all of the cocoa slurry to refining. The refined and unrefined volumes or portions of cocoa slurry are then recombined to provide a recombined cocoa product. The cocoa nibs produced by the method may be further processed to provide cocoa liquor or chocolate.

19 Claims, 4 Drawing Sheets

(56) References Cited

U.S. PATENT DOCUMENTS

| | | | |
|---|---|---|---|
| 11,219,226 B2* | 1/2022 | Josyula | ............... A23G 1/0033 |
| 2003/0215558 A1 | 11/2003 | Kealey | |
| 2010/0303982 A1 | 12/2010 | Buri et al. | |
| 2013/0251858 A1 | 9/2013 | Dumarche | |
| 2014/0308428 A1 | 10/2014 | Huehn | |
| 2015/0017302 A1 | 1/2015 | Anijs | |

FOREIGN PATENT DOCUMENTS

| | | |
|---|---|---|
| EP | 3114940 A1 | 1/2017 |
| EP | 3114941 A1 | 1/2017 |
| EP | 3114942 A1 | 1/2017 |
| GB | 1425337 A | 2/1976 |
| RU | 2476075 C2 | 2/2013 |
| RU | 2484636 C2 | 6/2013 |
| SU | 1667621 A3 | 7/1991 |
| WO | 9834496 A1 | 8/1998 |
| WO | 2010073117 A2 | 7/2010 |

* cited by examiner

METHODS FOR REDUCED REFINING DURING COCOA LIQUOR PROCESSING

CROSS-REFERENCE TO RELATED APPLICATIONS

This application is a continuation of U.S. application Ser. No. 16/472,715, filed on Jun. 21, 2019, now U.S. Pat. No. 11,219,226 which was filed as Application No. PCT/US2017/068641 on Dec. 28, 2017, and which claims the benefit of U.S. Provisional Application No. 62/440,182, filed on Dec. 20, 2016 and Provisional Application No. 62/440,184, filed on Dec. 29, 2016, all of which are incorporated by reference as if completely written herein.

BACKGROUND

The manufacture of cocoa liquor and chocolate involves complicated and expensive processes, due at least in part to the number of energy-intensive processing steps used. Examples of such processing steps are grinding, milling, refining, and conching. A typical cocoa liquor production process involves the size reduction of cocoa nibs. Typical chocolate making may involve grinding and refining chocolate ingredients, such as cocoa powder, sugar and/or milk solids, into finely-ground powders, dispersing them within a fat base, such as cocoa butter, and conching the mixture.

The equipment and assets required to manufacture cocoa liquor, chocolate, and chocolate products are costly and can have expensive associated maintenance and operating costs. Therefore, it is desirable to have cocoa liquor and chocolate making processes that use less energy or have increased manufacturing capacity compared to traditional processes. Such processes can have considerable economic advantages, as well.

BRIEF DESCRIPTION

Embodiments for a method for processing cocoa nibs are disclosed. The method includes coarsely grinding a plurality of cocoa nibs to form a cocoa slurry and subjecting less than the entire volume of the cocoa slurry to refining. The unrefined and refined volumes or portions are then recombined.

In another aspect, a method for processing cocoa nibs is disclosed. The method includes coarsely grinding a plurality of cocoa nibs to form a cocoa slurry. The cocoa slurry is separated into a precipitate (a first stream) and a supernatant (also referred to as, a second stream or liquid portion). The precipitate is refined to form a refined precipitate, and the supernatant and the refined precipitate are recombined to produce a recombined cocoa product, for example, a chocolate liquor.

In some embodiments, a method of making cocoa liquor is disclosed. The method includes coarsely grinding a plurality of cocoa nibs to form a cocoa slurry and subjecting less than the entire volume of the cocoa slurry to refining. The unrefined and refined volumes or portions are then recombined.

In another aspect, a method for processing a recombined cocoa product is disclosed. The method includes pre-grinding roasted cocoa nibs to create a cocoa slurry, separating the cocoa slurry into at least two portions to create a precipitate and a supernatant, refining the precipitate in one or more of refining steps to create a refined precipitate, and combining the refined precipitate and the supernatant to form a recombined cocoa product, for example, a cocoa liquor. The supernatant is not or substantially not comminuted prior to combining with the refined precipitate.

In some embodiments, the cocoa liquor is mixed and further refined with conventional chocolate ingredients, such as cocoa butter, milk and sugar, and then conched to create a chocolate.

Embodiments for a system for making a recombined cocoa product, specifically a cocoa liquor, are also disclosed. The system includes a grinder for grinding cocoa nibs into a cocoa slurry, a centrifuge for separating the cocoa slurry into a precipitate and a supernatant, and a refiner for comminuting the precipitate to form a refined precipitate. The centrifuge is operated to produce the supernatant having at least 15%, desirably at least 25%, by weight cocoa solids, wherein the supernatant cocoa solids have a range of particle sizes less than or equal to the range of particle sizes of the refined precipitate. The particle size of cocoa solids can be measured, for example, using a micrometer, including a Mitutoyo™ micrometer or microcaliper. In some embodiments, the cocoa solids in the supernatant has a particle size range of the D90 value of 40 µm or less.

In some embodiments described herein provide a method of making a chocolate, comprising the steps of pre-grinding roasted cocoa nibs to create a cocoa slurry; separating the cocoa slurry to create a precipitate and a supernatant; refining the precipitate along with one or more of chocolate ingredients, e.g., sugar and/or cocoa powder, in one or more refining steps to create a cocoa mixture, specifically a refined chocolate mixture; and combining and conching the refined cocoa mixture, supernatant and one or more chocolate ingredients, e.g., cocoa butter, to create a recombined cocoa product, specifically a combined cocoa mixture, more specifically a conched chocolate, wherein the supernatant is not or substantially not comminuted prior to combining.

In some embodiments described herein provide a method for processing cocoa nibs, the method comprising a) coarsely grinding cocoa nibs to form a cocoa slurry comprising a cocoa liquid and cocoa solid particles in the cocoa liquid, wherein the cocoa liquid comprises cocoa butter, b) separating the cocoa slurry in a separation step into a liquid portion and a precipitate portion, wherein the liquid portion comprises a portion of the cocoa solid particles forming a particle portion within the liquid portion, and wherein the particle portion comprises cocoa solid particles having a D90 value equal to or less than about 40 µm, c) refining the precipitate portion to form a refined precipitate in a refining step, and d) recombining the liquid portion and the refined precipitate in a combining step to produce a recombined cocoa product. In some embodiments, the refining step additionally includes one or more of chocolate ingredients, and the combining step mixes and conches along with chocolate ingredients such as cocoa butter. In these embodiments, the recombined cocoa product is a chocolate.

FIGURES

Certain exemplary embodiments will be described with additional specificity and detail through the use of the accompanying drawings, in which.

DETAILED DESCRIPTION

The present specification provides certain definitions and methods to better define the subject matter and to guide those of ordinary skill in the art in the practice of the subject matter presented herein. Provision, or lack of the provision, of a definition for a particular term or phrase is not meant to imply any particular importance, or lack thereof. Rather, and unless otherwise noted, terms are to be understood according to conventional usage by those of ordinary skill in the relevant art.

The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced item, and the terms "front", "back", "bottom", and/or "top", unless otherwise noted, are merely used for convenience of description, and are not limited to any one position or spatial orientation.

If ranges are disclosed, the endpoints of all ranges directed to the same component or property are inclusive and independently combinable (e.g., ranges of "up to 25 wt. %, or, more specifically, 5 wt. % to 20 wt. %," is inclusive of the endpoints and all intermediate values of the ranges of "5 wt. % to 25 wt. %," etc.).

Reference throughout the specification to "one example" or "an example" means that a particular feature, structure, or characteristic described in connection with an example is included in at least one embodiment. Thus, the appearance of the phrases "in one example" or "in an example" in various places throughout the specification is not necessarily referring to the same embodiment. Further, the particular features, structures or characteristics may be combined in any suitable manner in one or more embodiments.

As used herein a processing "stage" is demarcated by the input to and output of a material to/from a processing apparatus. For example, a refining stage starts when material is input into a refiner and ends when the resulting material is output from the refiner.

Unless otherwise specified herein, the "particle size" of a material includes the Mitutoyo particle size of the material and the D90 value from a particle size distribution measured via laser light diffraction. The particle size distribution is a way of characterizing particle size of a material including multiple particles. Of the multiple "DXX" values available in a particle size distribution, the D90 value is the DXX value primarily used herein to characterize the material, because this application is primarily concerned with the size of the largest particles in the material. For example, the D90 value is the particle size (e.g., diameter) at which 90% of a sample's mass is comprised of smaller particles. The particle size distributions mentioned herein are measured according to size measurements using laser light diffraction. As used herein, a Mitutoyo particle size is the particle size of a representative sample of a material as measured by a Mitutoyo™ micrometer or microcaliper.

An in-spec cocoa liquor refers to a cocoa liquor that meets a set of criteria including a minimum particle size. Criteria for in-spec cocoa liquor are known to those skilled in the cocoa liquor art.

As used herein, the term "chocolate" includes SOI chocolates and chocolate-like product, unless otherwise indicated. The term "chocolate-like product" includes non-SOI chocolates with a fat phase or fat-like composition in which one or more of conventional chocolate ingredient are replaced with other ingredients. Typically, a chocolate-like product has the cocoa butter is replaced with another fat, such as a vegetable fat other than cocoa butter. An example of a chocolate-like product is a compound chocolate. SOI chocolates are compositions that conform to the U.S. Standards of Identity for a chocolate. The standards of identify for different kinds of chocolate are found in Title 21, Part 163 of the Code of Federal Regulations, which is hereby incorporated herein by reference. Non-SOI chocolates include those in which at least one of the standard ingredients of chocolate (i.e., one or more of the nutritive carbohydrate sweetener, the cocoa butter, and the milk fat) are replaced partially or completely, those in which components that have flavors that imitate milk, butter, or chocolate are used, and those in which other additions or deletions in the formulation are made that are outside the FDA standards of identity of chocolate.

Chocolate includes dark chocolate, baking chocolate, milk chocolate, sweet chocolate, semi-sweet chocolate, buttermilk chocolate, skim milk chocolate, mixed dairy chocolate, low fat chocolate, white chocolate, aerated chocolates, compound coatings, and chocolate-like compositions, unless specifically identified otherwise. The term "chocolate" or the term "chocolate like product" also includes crumb solids or solids fully or partially made by a crumb process. Chocolate-like products can be prepared similar categories of chocolate other than white chocolate.

The methods described herein may be applied to full fat or reduced fat chocolate or chocolate-like product. The term "fat" as used herein, refers to triglycerides typically used in food products, especially confectionery products, chocolate, and chocolate like products. Fats useful in the methods described herein include the naturally occurring fats and oils such as cocoa butter, pressed cocoa butter, expelled cocoa butter, solvent extracted coco butter, refined cocoa butter, milk fat, anhydrous milk fat, fractionated milk fat, milk fat replacers, butterfat, fractionated butterfat, and vegetable fat, as well as other modifications of these fats, including but not limited to cocoa butter equivalents (CBE), cocoa butter substitutes (CBS), cocoa butter replacers (CBR), antiblooming agents, such as behenoyl oleoyl behenate (BOB), reduced calorie fats and/or synthetically modified fats, including reduced calorie fats and non-caloric fat substitutes.

A reduced calorie fat is a fat having all the properties of typical fat but having fewer calories than typical fat. A non-caloric fat substitute, e.g., a sucrose polyester, likewise processes all the typical fat characteristics, but is not absorbed after ingestion and thus is not metabolized. A chocolate or chocolate-like product has a total fat content greater than 25% by weight and typically, a total fat content of from 25% to 35% by weight. On the other hand, a "reduced-fat" chocolate or chocolate like product has a total fat content less than 25% by weight.

Methods of processing cocoa nibs and/or providing cocoa liquor are provided that are more economical than conventional methods for doing so, while yet producing processed cocoa nibs or liquor that is of similar, or the same, quality and is similar, or the same, in attributes to cocoa nibs or cocoa liquor processed conventionally. The methods are based upon the discovery that not all of a cocoa slurry need be refined in order to provide processed cocoa nibs or cocoa liquor that is commercially acceptable. Generally speaking, the methods include coarse grinding cocoa nibs to form a coarse slurry, separating the coarse slurry into at least two portions, and then refining only certain separated portion or portions of the slurry. The slurry may be subjected to simply volumetric separation, or, may be separated via any known means of separating a slurry comprising differently sized particles, including any type of filtration, centrifugation or decantation. In some embodiments, the slurry is separated by centrifugation. The portion subject to further refining is the portion that contains the larger sized particles. In some embodiments, the coarse slurry is separated into one portion having substantially most of the liquid content of the slurry and small particles of the cocoa solids produced from the cocoa nibs, and the other portion having substantially most of the large cocoa solids. In some embodiments, the cocoa solid particles can be separated using the particle size value of D90 of 40 µm or less. In other embodiments, the cocoa solid particles can be separated using the particle size value of D90 of 30 µm or less. In some embodiments, the cocoa solid particles can be separated by the particle size value of D90 of 40 µm. In some embodiments, the cocoa solid particles can be separated by the particle size value of D90 of 30 µm or 35 µm.

Since not all of the cocoa slurry is subject to refinement, cost savings are realized. In particular, if less material is refined, the refining stages can be completed in less time, smaller/lower cost refiners can be used, and/or the increased capacity of existing refiners can allow a higher downstream product output (e.g., of cocoa liquor).

Surprisingly, it has been discovered that although at least a portion of the cocoa slurry bypasses at least an initial refining step, downstream products produced using the disclosed methods have organoleptic qualities equivalent to those provided by products made from a cocoa nibs or a cocoa slurry processed conventionally, while still reducing refining time and resources by, for example, around 50%.

Figure 1:
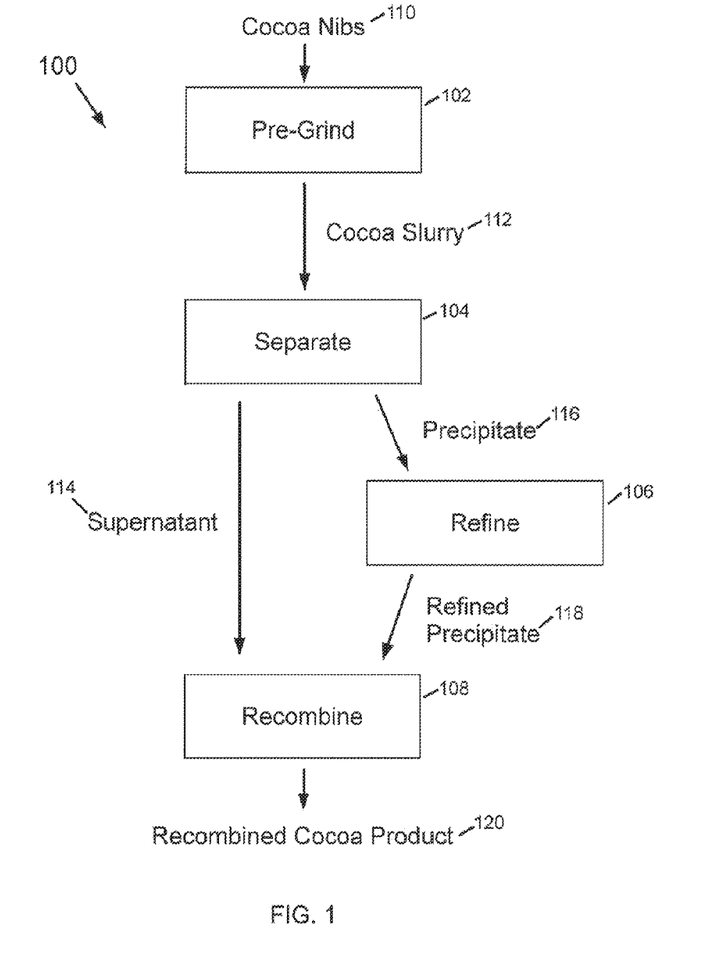
FIG. 1 is a flow diagram of an example method of processing cocoa nibs.

One embodiment of a method of processing cocoa nibs is shown in FIG. 1. Generally speaking, method 100 involves coarsely grinding (or pre-grinding) 102 cocoa nibs to provide a slurry 112, separating 104 the slurry into two portions, only one of which is refined 106. The refined and unrefined portions are combined at 108 to provide the cocoa product 120.

Method 100 begins with a plurality of cocoa nibs 110. As known, a cocoa nib is the part of a cocoa bean that is inside the shell. The cocoa nibs 110 can be any suitable cocoa nibs and can be prepared in any suitable manner. For example, the cocoa nibs 110 can be of any suitable variety, mix of varieties, size, shape, or quantity. Also, the cocoa nibs 110 can be fermented and roasted or unroasted. In some embodiments, the cocoa nibs 110 are roasted. In any case, however, a plurality of cocoa beans are shelled to provide the cocoa nibs 110. In an example, the cocoa nibs 110 begin method 100 in a substantially unground form. That is, the cocoa nibs 110 at the start of method 100 are in a solid, substantially whole form, and can also include pieces having a particle size at least as large as 1 mm.

The cocoa nibs 110 are ground 102 to produce a cocoa slurry 112. This first grinding 102 is a coarse grind to break up the cocoa nibs and can be performed by any grinder known in the chocolate industry. In an example, an impact mill is used to grind 102 the cocoa nibs 110. This first grinding 102 can be referred to as a pre-grind, because it is a coarse reduction in the size of the cocoa nibs prior to subsequent refining, which further reduces the size of large particles in the cocoa slurry 112. The pre-grinding 102 also heats the cocoa nibs, thereby liquefying some of the cocoa butter therein. The resulting cocoa slurry 112 is a liquid with solid cocoa particles suspended therein. Since the pre-grind 102 is a coarse grind, the solid cocoa particles of the cocoa slurry 112 can have a range of different particles sizes, for example, up to 500 µm particle size range, and the solid cocoa particles can have a Mitutoyo particle size in the range of 30-500 µm. In some embodiments, the D90 value of the cocoa slurry 112 can be in the range of 40-100 µm. In another example, the D90 value of the cocoa slurry 112 can be in the range of 35-50 µm.

Prior to refining 106 of the cocoa slurry 112, the cocoa slurry 112 is separated 104 into at least two portions. This separation may be done via any method capable of doing so based upon particle size, including filtration, decantation or centrifugation. In some embodiments, centrifugation is used, and results in the formation of a second or liquid portion or supernatant 114, and a first portion or precipitate 116. In a first example, the cocoa slurry 112 is separated 104 such that the second portion or supernatant 114 has a major portion of the liquid portion of the slurry 112, e.g., cocoa butter, and solid particles having a particle size or particle size range smaller than a threshold. In some embodiments, the second portion 114 contains at least 15%, desirably at least 25%, by weight of the smaller cocoa solid particles. The first portion 116, meanwhile, has a particle size or particle size range larger than the threshold although the first portion 116 may also contain minor amounts of particles smaller than the threshold along with larger particles.

In some embodiments, the threshold for separation may appropriately be 50 µm, while in another example the threshold may be 45 µm, in yet another implementation the threshold may be 40 µm, and in still another implementation, the threshold may be 35 µm. The resulting particle size of large particles of the first portion 116 is typically greater than 100 µm.

In some embodiments, the cocoa slurry 112 is separated 104 such that the second portion 114 has a particle size distribution with a D90 value equal to or less than a threshold of about 40 µm. In other embodiments, the D90 threshold for separation is equal to or less than about 35 µm, while in another embodiments the threshold is equal to or less than about 30 µm. In some embodiments, the D90 threshold for separation is 40 µm. In some embodiments, the D90 threshold for separation is 35 µm. In some embodiments, the D90 threshold for separation is 30 µm. In some embodiments, the D90 threshold for separation is 25 µm. The resulting D90 value for a particle size distribution of the first portion 116 is larger than 40 µm, larger than 35 µm, or larger than 30 µm, respectively.

In some embodiments, separation 104 is performed by a centrifuge (e.g., a horizontal centrifuge) as a batch or continuous process. Separation 104 to achieve the herein described attributes for the second portion 114, which contains the liquid supernatant and the small particles, and first portion 116, which contains the precipitate and some liquid, can be accomplished by appropriately setting the operating parameters (e.g., G force, input rate, differential, weir setting) of the centrifuge. The exact operating parameters for the centrifuge will depend on the attributes of the cocoa slurry 112 as well as the particle size threshold, among other things. Methods of determining the centrifuge parameters to achieve the above described attributes for the second portion 114 and first portion 116 are known to those skilled in the art. In other examples, other apparatus can be used for separating 104, such as a filter (e.g., screen, gravity filter, vacuum filter).

In some embodiments, one or more emulsifiers are added before, during or after separation 104. If an emulsifier is added after the separation 104, it may be added to the first portion 116 to facilitate the following refining step. Example emulsifiers that can be added include lecithin, polyglycerol polyricinoleate (PGPR, commercially available from Lipids Systems, Norway), glycerol, sucrose polyerucate (ER-290, sold by Mitsubishi Kasei Corporation, Japan), fractionated lecithins enriched in either phosphatidyl choline, or phosphatidyl ethanolamine, or phosphatidyl inositol or any combination thereof (sold by Lucas Meyers, Decatur, Illinois) hydroxylated lecithin, sucrose polystearate (sold by Mitsubishi Kasei Corporation, Japan), monophosphate derivatives of mono- and diglycerides/diacetyl tartaric acids esters of mono- and di-glycerides (PMD/DATEM, sold by Quest International, Hoffman Estates, Illinois), monosodium phosphate derivatives of mono- and di-glycerides of edible fats or oils, polyoxyethylene sorbitan monostearate, mono and di-glycerides of fatty acids, citric acid esters, sorbitan tristearate (STS), glycerol monostearate (GMS), sorbitan monostearate (SMS), ammonium phosphatide (E442 or YN, sold by Palsgaard, Juelsminde, Denmark), lactylated fatty acid esters of glycerol and propylene glycol, polyglycerol esters of fatty acids, propylene glycol mono- and di-esters of fats and fatty acids, hydrophobins, fractionated oat oil (PL-40, available from Lipid Systems, Norway), and the like or combinations of these. The lecithin can be derived from any source, such as soy, safflower, corn, oat, etc. If emulsifiers are desirably used, useful amounts are from 0.001% to 1 wt %, based upon the total weight of the cocoa slurry or the first portion 116.

In some examples, one or more emulsifiers are added at other suitable point(s) in the process. For example, an emulsifier can be added to the first portion 116 at the start of, or during, refining 106. Any suitable amount of emulsifier may be added, including any of the example emulsifiers discussed above with respect to separating 104.

The separation 104 of the cocoa slurry 112 can occur in either a batch or a continuous process. As an example of a batch separation 104, a portion (batch) of the cocoa slurry 112 can be input into a filter and allowed to separate into the second portion 114 and the first portion 116 over a period of time. After the batch has separated, the second portion 114 and the first portion 116, respectively, can be removed from the filter. A subsequent batch of cocoa slurry 112 can then be input into the filter and separated 104. This process of adding batches of cocoa slurry 112 to the filter, allowing the cocoa slurry 112 to separate over time, and removing the separated supernatant 112 and first portion 116 from the filter can be repeated to implement the batch separation 104.

The cocoa slurry 112 can be input for separation 104 at a temperature in the range of, for respective examples, 45 to 130° C., 50 to 110° C., or 75 to 110° C. In some situations, there may be a correlation between the input temperature of the cocoa slurry 112 and the amount of second portion 114 obtained during separation 104. In particular, the lower the temperature of the cocoa slurry 112 is below 85° C., the smaller the percentage of cocoa slurry 112 that may be separated 104 into the second portion 114. At a temperature below 45° C. separation 104 may be difficult.

The first portion 116 output from separation 104 is refined 106 to reduce the size of the particles therein. As used herein refining 106 includes milling, grinding, comminuting, and other processes to reduce the size of cocoa particles. Refining 106 can include any suitable refining technique and be performed by any suitable refiner known in the cocoa liquor or chocolate industry. The refiner used for a stage of refining 106 can be a refiner selected from the group consisting of an attritor, impact mill with or without classification (e.g., pin mill, hammer mill), disc mill, stone mill, ball mill (agitated or vibratory), or roll refiner. After the first portion 116 has been refined 106, it is referred to herein as a refined precipitate 118.

Refining 106 can reduce the particle size of the first portion 116 such that the refined precipitate 118 has a particle size less than or equal to, for respective examples, 50 µm, 45 µm, 40 µm, 35 µm, 30 µm, 25 µm, 20 µm, or 15 µm, which particle size can be measured with a micrometer or microcaliper, such as Mitutoyo™ micrometer. The D90 value of a particle size distribution of the refined precipitate 118 can be less than or equal to, for respective examples, 40 µm, 35 µm, 30 µm or 20 µm.

In addition to reducing the particle size, refining 106 can reduce the apparent viscosity of the first portion 116. Much of the liquid part of the cocoa slurry 112 will likely be separated into the second portion 114. Because of this the second portion 114 will have a much lower apparent viscosity than the first portion 116. An exemplary range of apparent viscosity for the second portion 114 is 300 to 7,500 cP and an exemplary range of apparent viscosity for the first portion 116 is 100,000 to 730,000 cP. Refining 106 can reduce this apparent viscosity such that the refined precipitate 118 has an apparent viscosity of less than 30,000 cP, and in a particular example less than 5,000-20,000 cP.

As used herein, apparent viscosity is measured by a viscometer, such as a Brookfield viscometer. The viscosity and other measurements referred to herein refer to the characteristics of the material (e.g., first portion 116) while the material is in the process. Thus, the measurements are obtained at parameters as close as possible to the parameters of the material while the material is in the process. For example, for an apparent viscosity measurement of the first portion 116 output from separation 104, the apparent viscosity would be measured at a temperature as close as possible to the temperature of the first portion 116 at that point in the process.

In some embodiments, optionally, other ingredients, such as chocolate ingredients, can be mixed in with the first portion or precipitate 116 to further refine the mixture of the first portion the chocolate ingredients when the desired final product of the present process 100 is a chocolate. Referring to FIG. 4, before or during refining 106, chocolate ingredient such as sugar and/or a sugar substitute along with one or more other ingredients 122 can be added to the precipitate 116 to produce a chocolate or chocolate-like product at the end of the process 100. Ingredients 122 added to create a chocolate or chocolate like product can include one or more cocoa based materials, sugars, sugar substitutes, milk powders, milk substitutes, fat, emulsifiers, and mixtures thereof. Preferably, the cocoa based materials include cocoa powder, cocoa butter, cocoa liquor, and mixtures thereof. Milk powders include, for example, skimmed milk powder, whey powder and derivatives thereof, full cream milk powder and mixtures thereof. Suitable sugars include sucrose, fructose, glucose and dextrose and mixtures thereof. Sugar substitutes preferably include inulin, dextrin, isomaltulose, polydextrose and maltitol and mixtures thereof. The added ingredients 122 may also optionally include artificial and non-artificial flavors, such as vanilla or vanillin. In some embodiments, the chocolate ingredients 122 are dry or powder ingredients, e.g., sugar, sugar substitute, milk powder and cocoa powder, and not liquid or wet ingredients, e.g. cocoa butter, chocolate liquor, and other liquid fats, such that the refined product resulting from the refining step 106 does not form an agglomerated paste and is substantially free flowing. When other chocolate ingredients 122 are mixed in with the precipitate 116, the refining step 106 results in refined precipitate combined with the added chocolate ingredients, which are also refined during the refining step 106. The resulting refined, combined precipitate and other chocolate ingredients are herein referred to as a refined cocoa mixture, which is an equivalent of refined precipitate 118 of FIGS. 1-3 without the chocolate ingredients. As discussed above, the refiner used for the refining step 106 in general can be a refiner selected from the group consisting of an attritor, impact mill with or without classification (e.g., pin mill, hammer mill), disc mill, stone mill, ball mill (agitated or vibratory), or roll refiner. In some embodiments, when the refining step 106 includes dry chocolate ingredients, as discussed above, an air classifier mill or a roll refiner can be used to produce refined mixture 119, as illustrated in FIG. 4.

For illustration purposes, referring to FIG. 1, at least a portion of the second portion 114 bypasses some or all of the refining 106 and is recombined 108 with the refined precipitate 118 to form a recombined cocoa product 120. In respective examples, at least 95%, at least 90%, at least 85%, at least 80%, at least 75%, at least 50%, or at least 25%, by weight, of the cocoa slurry 112 bypasses some or all of the refining 106 as the second portion 114. After bypassing some or all of the refining 106, the second portion 114 is subsequently recombined 108 with the refined precipitate 118 to produce a recombined cocoa product 120. In some embodiments, when the optional chocolate ingredients are not mixed in with the first portion 116 during the refining step 106, the recombining step 108 produces a chocolate liquor as the recombined cocoa product 120.

In some embodiments, when the optional chocolate ingredients are mixed in with the first portion 116 to produce a refined mixture 118, the refined mixture 118 is recombined 108 with the second portion or supernatant 114 to produce a recombined cocoa product 120, which also contains refined chocolate ingredients. The recombined cocoa product 120 may be subsequently conched to produce a conched chocolate. Alternatively, when the refined mixture 118 is recombined with the second portion 114, the recombining step 108 can be a conching step that simultaneously combine, mix and conche the refined mixture and the second portion 114. Referring to FIG. 4, the refined mixture 118 before, during, and/or after being recombined with the supernatant 114 can be conched 108. In some embodiments, the refined mixture 118 is recombined with the supernatant 114 and then the recombined cocoa product 120 is conched to produce a conched product. In some embodiments, the refined mixture 118 and the supernatant 114 are simultaneously combined and conched in a conching step 108 to produce a conched chocolate 120, as illustrated in FIG. 4. As known, conching 108 is a process in which a chocolate or chocolate like product precursor is subjected to pressure and shear forces in order to enhance its sensory properties. Conching 108 can be performed by any suitable apparatus such as a conche or a refiner-conche. Other chocolate ingredients 124 in addition to the supernatant 114 and the refined chocolate mixture 118 can be added at the start of, or during, the recombining and/or conching. Such chocolate ingredients include additional cocoa butter, other fats, and/or emulsifier.

As discussed above, one or more chocolate ingredients may be added prior to, or during, the recombination step 108 such that the recombined cocoa product 120 includes the one or more other ingredients in addition to the second portion 114 and the refined precipitate 118. For example, ingredients added to prepare a chocolate or chocolate-like product can include one or more cocoa based materials, sugars, sugar substitutes, milk powders, milk substitutes, fat, emulsifiers, and mixtures thereof. Preferably, the cocoa based materials include cocoa powder, cocoa butter, cocoa liquor, and mixtures thereof. Milk powders include, for example, skimmed milk powder, whey powder and derivatives thereof, full cream milk powder and mixtures thereof. Suitable sugars include sucrose, fructose, glucose and dextrose and mixtures thereof. Sugar substitutes preferably include inulin, dextrin, isomaltose, polydextrose and maltitol and mixtures thereof. The added ingredients may also optionally include artificial and non-artificial flavors, such as vanilla or vanillin.

In some embodiments, the intermediate cocoa forms (e.g., cocoa slurry 112, second portion 114, first portion 116, and refined precipitate 118) are maintained at a temperature of at least 45° C., desirably at least 75° C., throughout method 100 in order to maintain the desired viscosity and separation properties of the intermediate cocoa forms. Typically, the processing temperature of the intermediate cocoa forms are not maintained for an extended period of time at a temperature higher than 130° C., more specifically 125° C.

The recombined cocoa product 120 can be subjected to further processing or can be packaged as a finished product. For example, if the recombined cocoa product 120 is an in-spec cocoa liquor, the in-spec cocoa liquor can be packaged and sold as such. As known to those skilled in the art, cocoa liquor (also referred to as cocoa mass) is a refined form of cocoa nibs, including both the cocoa solids and the cocoa butter from the cocoa nibs without added sugar or sugar substitute. Or, the in-spec cocoa liquor produced can be processed further by adding sugar and/or a sugar substitute along with one or more other ingredients to generate a chocolate or chocolate like product. Such a chocolate or chocolate like product can be sold and packaged as is (e.g., as a chocolate bar) or can be used as a portion of a multi-region confectionery (e.g., for enrobing a candy bar).

Unless specified otherwise, in some examples one or more additional actions (e.g., mixing, refining, etc.) can be performed in between or during suitable stages of method 100.

Method 100 can reduce processing costs and/or increase processing capacity of a cocoa liquor process or chocolate production process by enabling the at least a portion of the second portion 114 to bypass some of the refining step 106. For example, the particle size threshold for separation 104 can be selected at a size that is smaller than or equal to a desired particle size for the refined precipitate 118 (i.e., a particle size after refining 106). With the threshold selected as such, the particle size of the second portion 114 is at or lower than the desired particle size for the refined precipitate 118. The second portion 114, therefore, can bypass refining 106. Bypassing refining 106 with the second portion 114 reduces the amount of material that is refined 106. If less material is refined, the refining 106 stages can be completed in less time, smaller/lower cost refiners can be used, and/or the increased capacity of existing refiners can allow a higher downstream product output (e.g., of cocoa liquor). After the bypassed refining stage(s) 106, the second portion 114 is recombined 108 with the refined precipitate or refined mixture 118 to form a recombined cocoa product 120.

It has been discovered that although at least a portion of the slurry 112 bypasses refining 106, downstream products produced using the process of method 100 have organoleptic qualities equivalent to those provided by products made from a cocoa nibs or a cocoa slurry processed conventionally, and yet production utilizing method 100 can reduce refining time and resources by, for example, around 50%.

In conventional processes, all of the cocoa slurry goes through each refining stage. The process of method 100, in contrast, enables a portion of the cocoa slurry 112 (all or a portion of the second portion 114) to bypass one or more stages of refining 106. Since the second portion 114 can comprise 50% or more by weight of the cocoa slurry 112, separating out the second portion 114 for bypassing of one or more stages of refining 106 can reduce by half the amount of material that is processed in the bypassed stage(s) of refining 106. In an implementation of this example, the particle size threshold can be selected to be a size that is smaller than or equal to a particle size (e.g., D90 value) for a finished cocoa product (e.g., for an in-spec cocoa liquor or finished chocolate). Selecting such a threshold can enable the second portion 114 to bypass refining 106. In situations in which the finished chocolate is used to make a single or multi-region confection, the particle size of the second portion 114 can thus be equal to or smaller than the particle size of the chocolate in the confection. The particle size of a solid form finished cocoa product (e.g., a chocolate bar) is the particle size of a representative sample of the solid finished cocoa product after the solid finished cocoa product is melted and at a temperature of, for example, 40° C.

Although the threshold for separating 104 provides a set demarcation in particle size between the second portion 114 and the first portion 116, in practice, the first portion 116 likely includes particles having a particle size smaller than the threshold along with the larger-than-threshold particles. That is, all particles having a particle size smaller than the threshold may not be separated into the second portion 114. It may be desirable to get as many of the smaller-than-threshold particles into the second portion 114 as possible, since these particles are able to bypass the refining stage(s) 106. This desire, however, may appropriately be balanced with the effort and cost of doing so; therefore, some of the smaller-than-threshold particles may remain in the first portion 116. Moreover, in some implementations, it may be desirable for some of the smaller-than-threshold particles to remain in the first portion 116 to improve refining efficiency thereof by reducing the viscosity of the first portion 116.

As known, a cocoa nib is composed of two components: cocoa fat and cocoa solids. Cocoa fat is the fat portion of the cocoa nib and is referred to as cocoa butter. Cocoa solids are the non-fat portion of the cocoa nib and are referred to as cocoa powder when in a ground state including less than 20% by weight of cocoa butter.

Since the cocoa slurry 112 of method 100 is separated prior to refining 106, the cocoa fat (i.e., cocoa butter) and the cocoa solids within the cocoa slurry 112 are distributed into both the second portion 114 and the first portion 116 such that both cocoa fats and cocoa solids are included in bot portions. However, the first portion (precipitate) 116 will include a significant portion of cocoa solids, and the second portion (supernatant) 114 will include a significant portion of cocoa fat. In one example, the cocoa fat portion of the second portion 114 can be in the range of 55 to 75% by weight with the remaining portion being cocoa solids (e.g., 25-45% by weight cocoa solids). In another example, the cocoa fat portion of the first portion 116 can be in the range of 40 to 60% by weight with the remaining portion of the first portion 116 being cocoa solids (e.g., 40-60% by weight cocoa solids). In an example, the cocoa fat portion by weight of the second portion 114 is within 20% points of the cocoa fat portion by weight of the first portion 116.

This is in contrast to conventional cocoa processing processes that perform a separation step. In such conventional processes the separation step is performed after refining, in which case the cocoa liquor is in a refined state. In such conventional processes, the separation step has the purpose of extracting cocoa butter from a cocoa liquor. The cocoa butter in these conventional processes can be extracted either for sale or later use as a cocoa butter, or to reduce the cocoa fat content of the cocoa liquor and thereby increase its cocoa solids content (e.g., for generation of dark chocolate). Since the purpose of these conventional processes is to remove cocoa butter from a cocoa liquor, the cocoa butter portion after separation is almost entirely cocoa butter (e.g., more than 90%) and the cocoa solids portion is at least 60%, at least 70%, at least 75%, at least 80%, or at least 85%, cocoa solids.

The separation step 104 performed in method 100, in contrast, is performed prior to refining 106 of the cocoa slurry 112. At this early stage in the process, 40% or more of the cocoa fat in the cocoa slurry 112 may remain bound up in/with larger particles of the first portion 116 and, as such, this portion of the cocoa fat is not separated into the second portion 114. This is not of concern in method 100, however, since the separation 104 of method 100 is not for the purpose of extracting the cocoa fat from the cocoa solids. In contrast, the separation 104 of method 100 is for separating the particles having a particle size larger than the threshold from the particles having a particle size smaller than the threshold, regardless of whether the particles are composed of cocoa solids, cocoa fat, or both. The separation 104 has the goal of separating the larger-than-threshold particles into the first portion 116 so that they can be further refined to reduce the size thereof, and separating the smaller-than-threshold particles into the second portion 114 so that they can bypass at least a portion of the refining 106. The separation 104 of method 100 is not concerned with where the cocoa fat or cocoa solids portion of the cocoa slurry 112 ends up. Cost savings can therefore be achieved in the form of lesser energy costs for refining, lesser work hours, smaller/fewer refining equipment, slower degradation of refining equipment, and/or rendering manufacturing assets available for other uses.

Additionally, conventional processes which perform a separation pressing step on a cocoa liquor for the purpose of separating cocoa butter, typically end up with less than half of the cocoa liquor by weight in the cocoa butter portion, since only a little more than half of the cocoa liquor (60% at most) is cocoa butter. Again, the separation 104 of the present method 100 is for the purpose of separating the cocoa slurry 112 into the second portion or supernatant 114 containing smaller particle cocoa solids, and the first portion or precipitate 116 containing mostly larger particle cocoa solids. In some embodiments, at least 50% by weight of the cocoa slurry 112 is separated into the second portion 114 and less than 50% by weight of the cocoa slurry 112 is separated into the first portion 116. In some embodiments, in the range of 50-70% by weight of the cocoa slurry 112 is separated into the second portion 114 and in the range of 30-50% by weight is separated into the first portion 116.

In a given embodiment, the percentage of the cocoa slurry 112 separated into the second portion 114 and the first portion 116 respectively, as well as the cocoa fat portion of each, will depend on the relative make-up of the cocoa slurry 112 in terms of the amount of liquid, its particle size (e.g., Coulter Principle particle size distribution), and the effort put forth to separate the particles.

In many examples, the second portion 114 will not be refined separately (i.e., in one or more distinct refining stages) from the first portion 116 prior to be recombined 108. Alternatively, however, the second portion 114 or portions thereof can be refined separately from the first portion 116, prior to recombining 108. Although some or all of the second portion 114 is refined in such alternative examples, separating the second portion 114 from the first portion 116 can still achieve process advantages as described herein because the overall amount of refining may still be reduced. That is, although the second portion 114 would still be subject to refining, the second portion 114 may be subject to less or different refining that if it were not separated from the first portion 116. The less or different refining due to the different properties of the second portion 114 from the first portion 116 (e.g., the smaller particle size of the second portion 114).

The recombining 108 of the second portion 114 with the first portion 116 can occur in any suitable manner and at any suitable stage of processing. For example, the second portion 114 and the refined precipitate 118 can be recombined 108 after all refining has been completed (e.g., in a holding tank), such that the second portion 114 bypasses all refining stage(s) 106 of the precipitate 118.

Figure 2:
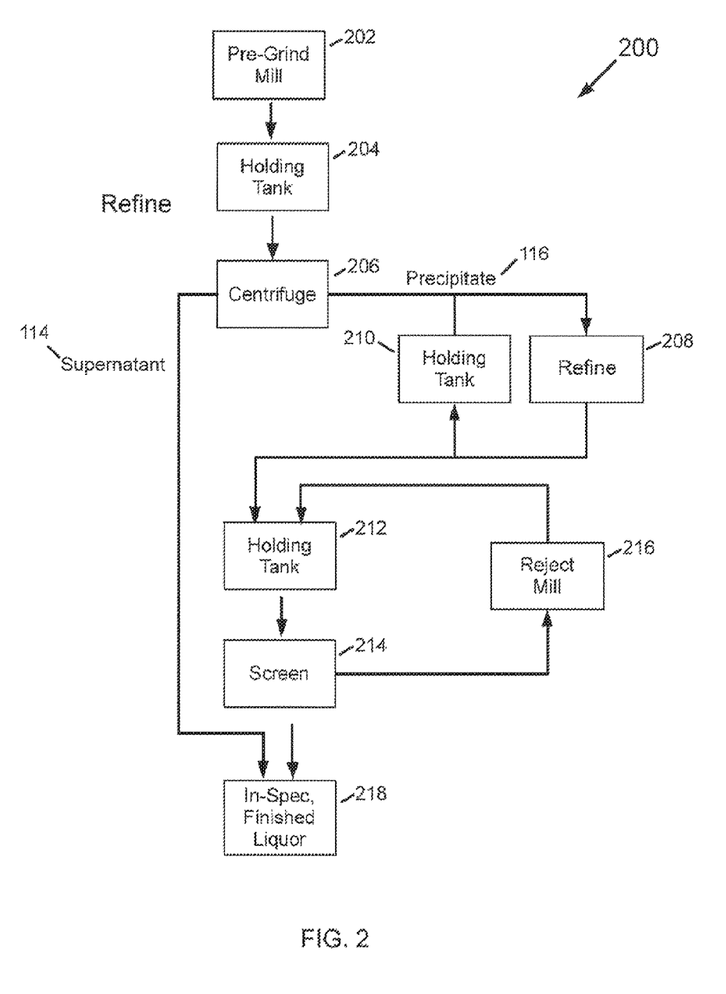
FIG. 2 is a flow diagram of an implementation of the method of FIG. 1 in which cocoa liquor is generated.

FIG. 2 is an embodiment 200 of method 100 in which a centrifuge is used in the separation step 104 and a cocoa liquor is generated. In embodiment 200, the cocoa nibs 110 are ground by a mill 202 to produce a cocoa slurry 112 which can be held in a first tank 204. The cocoa slurry 112 from the first tank 204 is added to a centrifuge 206 for separation 104. The centrifuge 206 separates 104 the cocoa slurry 112 into a supernatant 114 and a precipitate 116. The centrifuge 206 is operated with operating parameters such that the particle size of the supernatant 114 is smaller than or equal to a threshold, which is set equal to a desired particle size of an in-spec cocoa liquor. In respective examples, the threshold is a D90 value of 40 µm, 35 µm, and 30 µm. Optionally, an emulsifier can be added to the slurry or the precipitate. In some embodiments, it is desirable to add an emulsifier to the precipitate to improve the processability of the precipitate.

The precipitate 116 has a particle size larger than that desired for the in-spec cocoa liquor, so the precipitate 116 is refined 106 by a process in which the precipitate 116 is milled by a refining process 208, for example, with one or more attritors. Optionally, the refining process can be a looping process in which the refined precipitate can be held in a second tanks 210 before the refined precipitate is further milled by recirculating the refined precipitate to the refining process 208. Once the precipitate 116 has been refined to the desired particle size, the refined precipitate 118 is held in a third tank 212. The refined precipitate 118 from the third tank 212 is then passed through screen 214 to separate out particles larger than the particle size of an in-spec cocoa liquor. The particles that are above the particle size are sent to a reject mill 216 (e.g., a ball mill) for further refinement 106. After further refinement 106, the cocoa product from the reject mill 216 is placed back into the third tank 212. Refined precipitate 118 that is smaller than the particle size of the screen 214 passes through the screen 214 and is placed in a fourth tank 218. A desired portion of the supernatant 114 bypasses the milling of the refining process 208 and the reject mill 216, and is placed and mixed with the refined precipitate 118 in the fourth tank 218 to generate an in-spec cocoa liquor as the recombined cocoa product 120.

Figure 3:
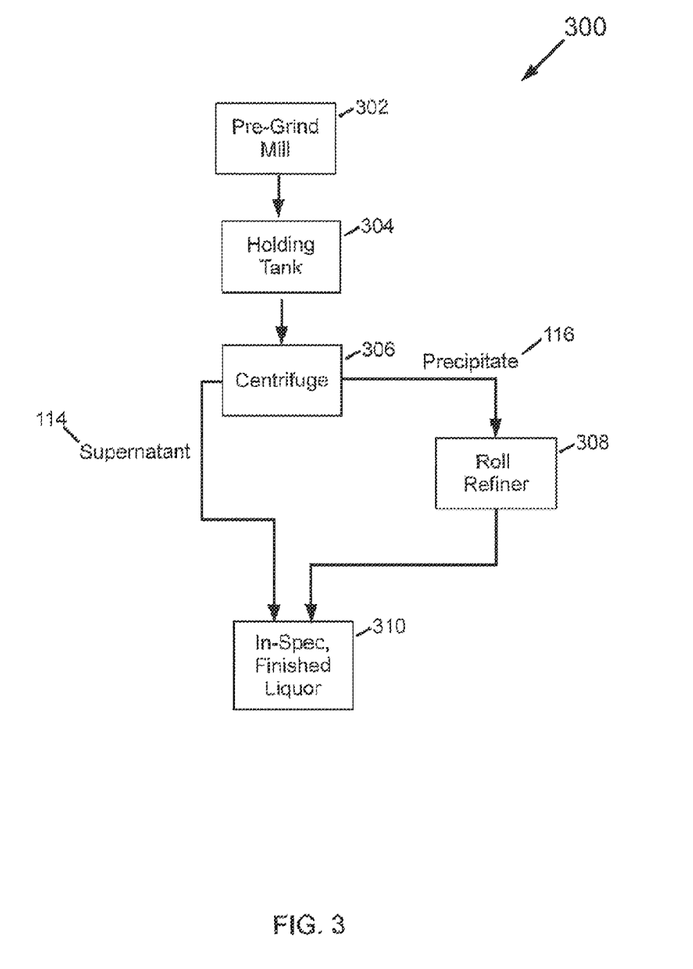
FIG. 3 is a flow diagram of another implementation of the method of FIG. 1 in which cocoa liquor is generated.
Figure 4:
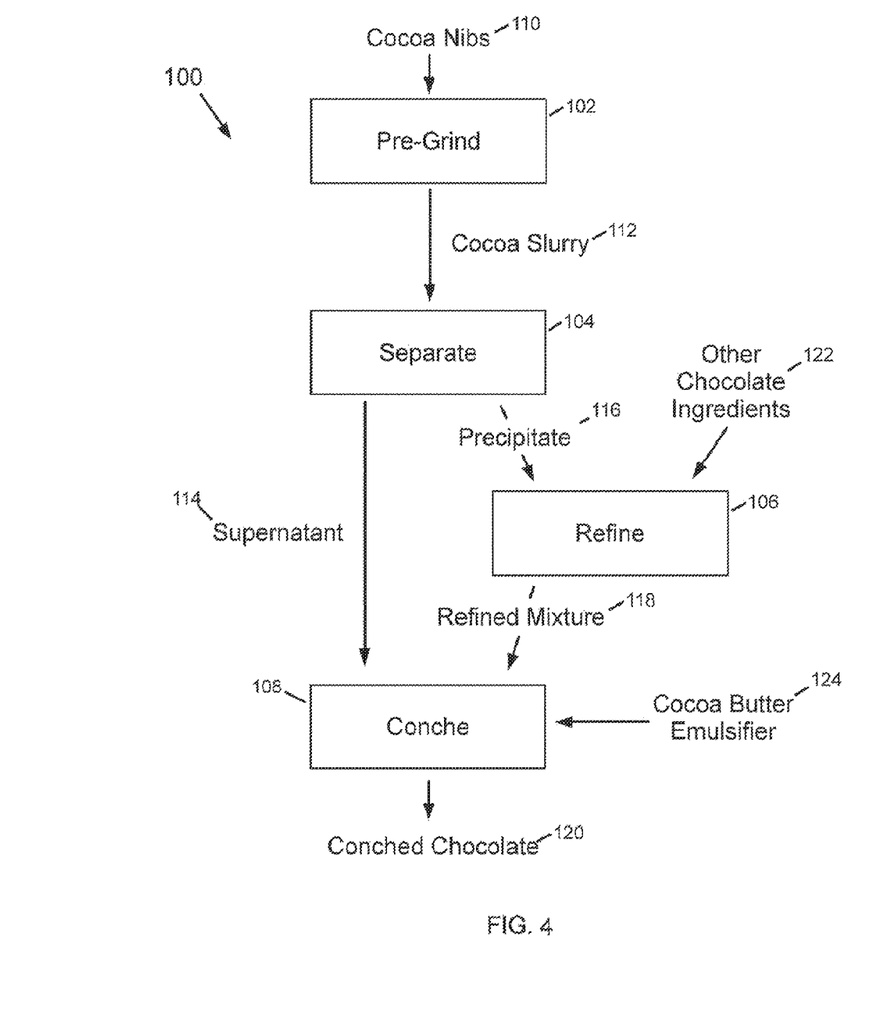
FIG. 4 is a flow diagram of an exemplary method of process cocoa nibs to produce a conched chocolate.

FIG. 3 is another implementation embodiment 300 of method 100 in which cocoa liquor is generated. In implementation 300, the cocoa nibs 110 are ground by a mill 302 to produce a cocoa slurry 112 which is held in a first tank 304. The cocoa slurry 112 from the first tank 304 is added optionally along with an emulsifier to a centrifuge 306 for separation. The centrifuge 306 separates the cocoa slurry 112 into a supernatant 114 and a precipitate 116. Separation with the centrifuge 306 is operated with operating parameters such that the particle size of the supernatant 114 obtained via centrifugation is less than or equal to a threshold, which is set equal to a desired particle size of an in-spec cocoa liquor. In respective embodiments, the threshold is a D90 value of 40 µm, 35 µm, and 30 µm.

The precipitate 116 has a particle size larger than that desired for the finished liquor, so it is refined, optionally along with an emulsifier, by one or more roll refiners 308 to generate a refined precipitate 118 having a particle size that is smaller than or equal to a desired particle size of the finished liquor. The refined precipitate 118 is held in a second tank 310. The supernatant 114 bypasses the one or more roll refiners 308 and is added to the second tank 310 and mixed with the refined precipitate 118 to recombine 108 the supernatant 114 and the refined precipitate 118 to generate an in-spec cocoa liquor.

The present invention is further illustrated with the following examples.

EXAMPLES

In the Examples below, cocoa slurry 112 was subjected to separation using a Sharples P 660 decanter centrifuge. The P 660 centrifuge had a bowl diameter of 6 inches and a bowl length of 14.5 inches. The cocoa slurry 112 was introduced using a feed pump with a 1 inch diameter hose having a cam-lock connection to the centrifuge. The supernatant (liquid) output of the P 660 centrifuge had a 1 inch diameter NPT connection and the precipitate (solids) output of the P660 centrifuge was an open chute. The cocoa slurry 112 input into the centrifuge at 1 gallon per minute. The G force on the P 660 decanter was set at 2100 g and the differential was set at 10 rpm, with the lowest weir setting (3½).

Each example includes tables with data from that Example. The "Coulter DXX" is the particle size at the XX % of a particle size distribution of the material as measured according to the Coulter Principle. The term "start up" refers to output from the supernatant and precipitate outputs of the centrifuge during start up and the term "residue" refers to cocoa slurry remaining in the centrifuge at the end of the corresponding experiment.

Example 1

Slurry Produced with a Hammer Mill.

In Example 1, 87.8 kg cocoa slurry 112 at a temperature of 110° C. was input into the centrifuge yielding 45.5 kg of supernatant 114 and 32.8 kg of precipitate 116. 9 kg of the input cocoa slurry 112 was output during start-up of the centrifuge and was not included in either the supernatant 114 or precipitate 116. 0.5 kg remained in the centrifuge at the end of the experiment. The centrifuge was operated on the cocoa slurry 112 for approximately 25 minutes.

Example 1

| Material | Coulter D10 (µm) | Coulter D25 (µm) | Coulter D50 (µm) | Coulter D75 (µm) | Coulter D90 (µm) |
|---|---|---|---|---|---|
| Cocoa Slurry | 1.065 | 4.067 | 8.249 | 14.3 | 28.8 |
| Supernatant | 0.908 | 3.676 | 7.601 | 12.9 | 20.1 |
| Precipitate | 1.826 | 5.761 | 12.61 | 77.33 | 181.0 |

Example 2

In Example 2, 77.95 kg of cocoa slurry 112 at a temperature of 75° C. was input into the centrifuge yielding 45.6 kg of supernatant 114 and 22.15 kg of precipitate 116. 9.5 kg of the input cocoa slurry 112 was output during start-up of the centrifuge and was not included in either the supernatant 114 or precipitate 116. 0.7 kg remained in the centrifuge at the end of the experiment. The centrifuge was operated on the cocoa slurry 112 for approximately 16 minutes.

Example 2

| Material | Coulter D10 (μm) | Coulter D25 (μm) | Coulter D50 (μm) | Coulter D75 (μm) | Coulter D90 (μm) |
|---|---|---|---|---|---|
| Cocoa Slurry | 1.0 | 4.1 | 8.1 | 13.3 | 20.3 |
| Supernatant | 1.1 | 4.0 | 7.8 | 13.0 | 19.6 |
| Precipitate | 1.2 | 4.9 | 9.8 | 18.8 | 82.1 |

Example 3

In Example 3, 79.25 kg of cocoa slurry 112 at a temperature of 65° C. was input into the centrifuge yielding 38.4 kg of supernatant 114 and 35.3 kg of precipitate 116. 5.6 kg of material made up the start-up and residue material and was not included in either the supernatant 114 or precipitate 116. The centrifuge was operated on the cocoa slurry 112 for approximately 15 minutes.

In Example 3, three streams of precipitate 116 were exiting the centrifuge. Two of the streams had a higher viscosity and were combined and measured as "Precipitate-1" in the table. The third stream had a lower viscosity and was measured as "Precipitate-2" in the table. Precipitate-1 and Precipitate-2 were combined and measured as "Precipitate-T".

Example 3 Continued

| Material | Coulter D10 (μm) | Coulter D25 (μm) | Coulter D50 (μm) | Coulter D75 (μm) | Coulter D90 (μm) |
|---|---|---|---|---|---|
| Cocoa Slurry | 1.1 | 4.1 | 8.3 | 14.3 | 25.2 |
| Supernatant | 1.2 | 4.4 | 8.6 | 14.3 | 24.6 |
| Precipitate-1 | 1.6 | 5.4 | 10.8 | 34.2 | 127.2 |
| Precipitate-2 | 1.2 | 4.6 | 8.9 | 15.7 | 40.4 |

Example 4

In Example 4, 159.1 kg of cocoa slurry 112 at a temperature of 106° C. was input into the centrifuge yielding 94.2 kg of supernatant 114 and 58.9 kg of precipitate 116. 6.0 kg of material made up the start-up and residue material and was not included in either the supernatant 114 or precipitate 116. The centrifuge was operated on the cocoa slurry 112 for approximately 34 minutes.

In Example 4, three streams of precipitate 116 were exiting the centrifuge. Two of the streams had a higher viscosity and were combined and measured as "Precipitate-1" in the table. The third stream had a lower viscosity and was measured as "Precipitate-2" in the table. Precipitate-1 and Precipitate-2 were combined and measured as "Precipitate-T".

Example 4

| Material | Coulter D10 (μm) | Coulter D25 (μm) | Coulter D50 (μm) | Coulter D75 (μm) | Coulter D90 (μm) |
|---|---|---|---|---|---|
| Cocoa Slurry | 1.1 | 4.4 | 9.1 | 16.8 | 47.0 |
| Supernatant | 1.0 | 4.0 | 8.0 | 13.6 | 21.9 |
| Precipitate-1 | 1.2 | 4.8 | 9.5 | 18.0 | 54.9 |
| Precipitate-2 | 1.3 | 4.8 | 9.5 | 17.8 | 49.5 |

Example 5

In Example 5, 114.3 kg of cocoa slurry 112 at a temperature of 110° C. was input into the centrifuge yielding 67.1 kg of supernatant 114 and 41.7 kg of precipitate 116. 5.5 kg of material made up the start-up and residue material and was not included in either the supernatant 114 or precipitate 116. The centrifuge was operated on the cocoa slurry 112 for approximately 22 minutes.

Example 5

| Material | Coulter D10 (μm) | Coulter D25 (μm) | Coulter D50 (μm) | Coulter D75 (μm) | Coulter D90 (μm) |
|---|---|---|---|---|---|
| Cocoa Slurry | 1.1 | 4.1 | 8.4 | 14.8 | 33.3 |
| Supernatant | 1.1 | 3.9 | 7.7 | 12.8 | 19.6 |
| Precipitate | 1.3 | 4.5 | 9.1 | 17.7 | 56.5 |

The precipitate can be refined with, for example, a ball mill or stone mill to refine the cocoa solid particles size and then the refined cocoa solid particles are recombined with the supernatant to produce a recombined cocoa product, such as a cocoa liquor.

Example 6

A precipitate mixture is prepared and refined in and air classifier mill (AC) with a precipitate with a fat content of 47 wt % along with milk powder, lactose and sugar. The precipitate has a D90 value of around 40 to 45 μm, and the Mitutoyo™ micrometer particle size sample measurement of around 300 μm. The amount of the precipitate in the precipitate composition is adjusted for the mixture composition introduced in the ACM to have a total fat content of about 6 wt %. The ACM is operated with an air inlet temperature at 49° C. The ACM is ran for 5 minutes with the precipitate mixture composition. The resulting refined precipitate composition has a particle size around 28 μm. The refined precipitate composition is then combined with a supernatant to produce a combined cocoa product of chocolate liquor. The chocolate liquor is equivalent to conventionally produced chocolate liquor, and the chocolate liquor is used to produce dark and milk chocolates that are equivalent to conventionally produced chocolates.

What is claimed is:
1. A method for producing a recombined cocoa product, which method comprises the steps of:
    grinding cocoa nibs to create a coarse cocoa,
    separating the coarse cocoa slurry in a single separating step to create a precipitate and a supernatant, wherein less than 50% of the coarse cocoa slurry by weight is in the precipitate after the separating step, and wherein the separating step is filtration, centrifugation or decantation, mixing the precipitate composition ingredients with a sweetener ingredient, refining that mixture comprising the precipitate in a refining step to create a refined precipitate composition, and combining the refined precipitate composition and the supernatant to form the recombined cocoa product.

2. The method of claim 1, wherein the coarse cocoa slurry is input to separating at a temperature in the range of 45 to 130° C., wherein the apparent viscosity of the precipitate is between 150,000 and 730,000 cP.

3. The method of claim 1, wherein the supernatant comprises a cocoa butter and cocoa particles, the cocoa solid particles have a D90 value equal to or less than about 40 μm, and the cocoa particles comprises at least 15 weight % of the total weight of the particulate portion.

4. The method of claim 3, wherein the cocoa solid particles have a D90 value equal to or less than about 30 μm.

5. The method of claim 1, wherein the precipitate comprises sugar and cocoa powder.

6. The method of claim 5, further comprising adding additional cocoa butter, and the additional cocoa butter in the combining step.

7. The method of claim 6, wherein the recombined cocoa product is a chocolate and the combining step mixes and conches the cocoa product ingredients.

8. The method of claim 1, wherein the recombined cocoa product is a chocolate liquor.

9. The method of claim 1, wherein the separating step is centrifugation.

10. A method for processing cocoa nibs, the method comprising:

coarsely grinding cocoa nibs to form a cocoa slurry comprising a cocoa liquid and cocoa solid particles, wherein the cocoa liquid comprises cocoa butter;

separating the cocoa slurry in a single separation step into a liquid portion and a precipitate portion, wherein the liquid portion comprises a portion of the cocoa solid particles forming a particle portion within the liquid portion, and wherein the particle portion comprises cocoa solid particles having a D90 value equal to or less than about 40 μm, and wherein the separating step is filtration, centrifugation or decantation;

mixing the precipitate composition ingredients with a sweetener ingredient;

refining the precipitate portion to form a refined precipitate portion; and combining the liquid portion and the refined precipitate portion to produce a recombined cocoa product.

11. The method of claim 10, wherein the liquid portion is not subjected to a process that significantly reduces particles sizes of the portion of the cocoa solid particles.

12. The method of claim 10, wherein the particle portion has a D90 value equal to or less than about 30 μm.

13. The method of claim 10, wherein the refining step further comprises adding an emulsifier to the precipitate portion.

14. The method of claim 10, wherein the refining step further comprises adding sugar and optionally milk powder to the precipitate portion.

15. The method of claim 14, wherein the combining step further comprises adding an additional cocoa butter.

16. The method of claim 15, wherein the combining step provides conching of the recombined cocoa product.

17. The method of claim 16, wherein the recombined cocoa product is a chocolate.

18. The method of claim 10, wherein the separating step is conducted in a centrifuge.

19. The method of claim 10, wherein the liquid portion is at least 50% by weight is the cocoa slurry.

* * * * *